(12) United States Patent
Fujikura

(10) Patent No.: US 8,665,530 B2
(45) Date of Patent: Mar. 4, 2014

(54) ZOOM LENS AND IMAGE PICKUP APPARATUS USING THE SAME

(75) Inventor: Takashi Fujikura, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/542,002

(22) Filed: Jul. 5, 2012

(65) Prior Publication Data

US 2013/0021674 A1 Jan. 24, 2013

(30) Foreign Application Priority Data

Jul. 22, 2011 (JP) ................................ 2011-160763

(51) Int. Cl.
*G02B 15/14* (2006.01)

(52) U.S. Cl.
USPC ........................................ 359/683; 359/676

(58) Field of Classification Search
CPC ..... G02B 15/173; G02B 15/177; G02B 13/18
USPC ................ 348/240.3, 340; 359/676, 683, 684
See application file for complete search history.

(56) References Cited

U.S. PATENT DOCUMENTS 7,511,898 B2 * 3/2009 Matsui .......................... 359/758

FOREIGN PATENT DOCUMENTS

JP 4496460 B2 4/2010

* cited by examiner

*Primary Examiner* — David N Spector
(74) *Attorney, Agent, or Firm* — Brosemer, Kolefas & Associates LLC

(57) ABSTRACT

A zoom lens includes, in order from the object side, a positive first lens group, a negative second lens group, a positive third lens group, a positive fourth lens group, a negative fifth lens group, and a positive sixth lens group. The first lens group, the third lens group, and the sixth lens group are fixed. The second lens group, fourth lens group, and the fifth lens group are movable. The first lens group includes a reflecting optical element that bends the optical path. The second lens group includes a negative lens and a cemented lens made up of a negative lens and a positive lens. The third lens group includes an aperture stop. The fourth lens group includes a positive lens and a negative lens. The fifth lens group includes a negative lens.

7 Claims, 15 Drawing Sheets

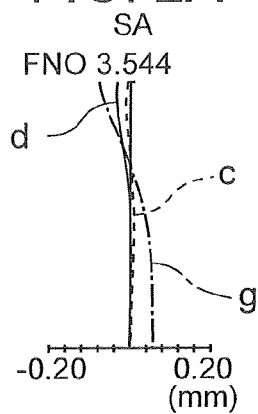
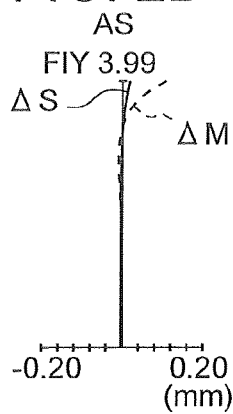
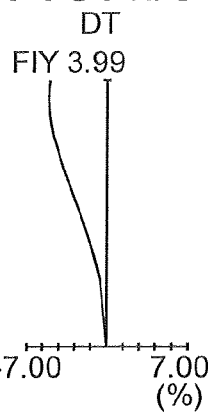
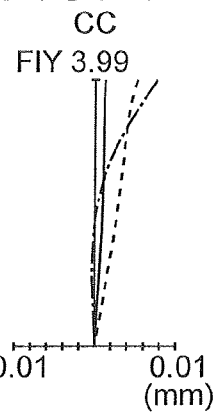
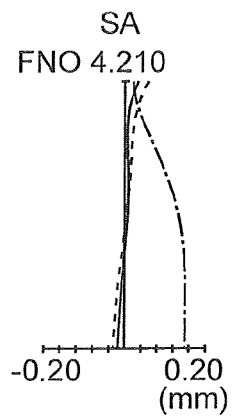
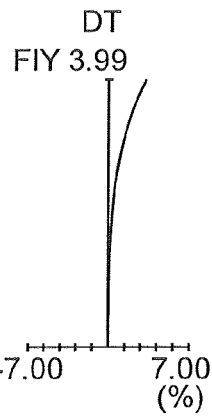
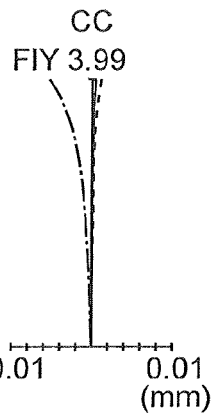
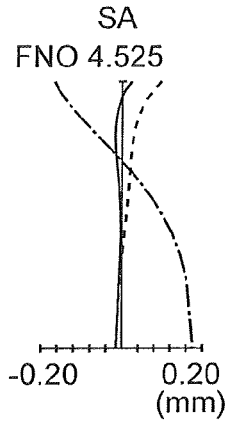
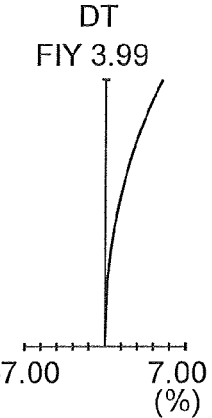
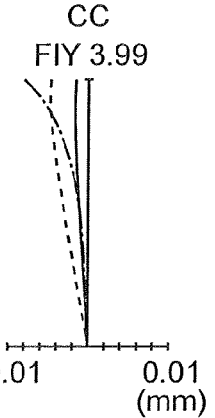

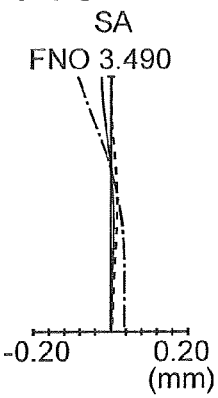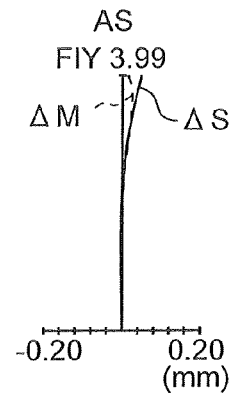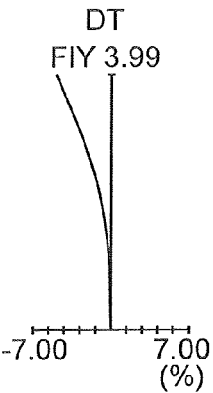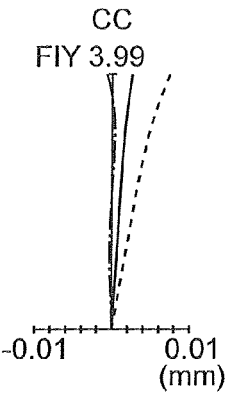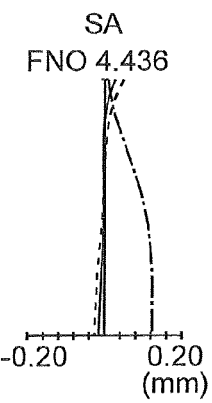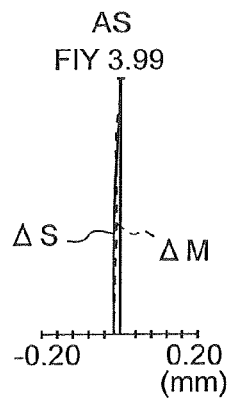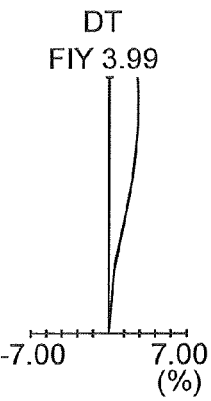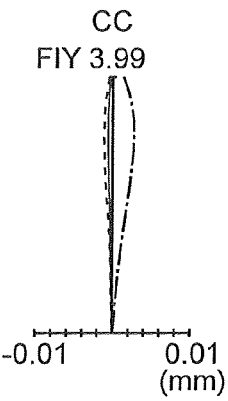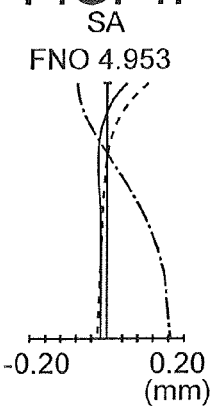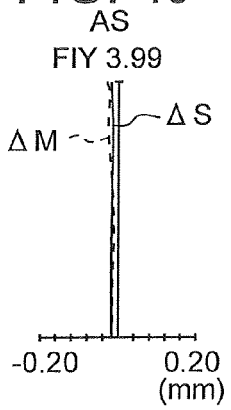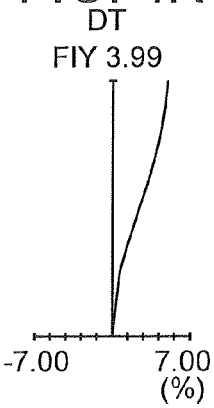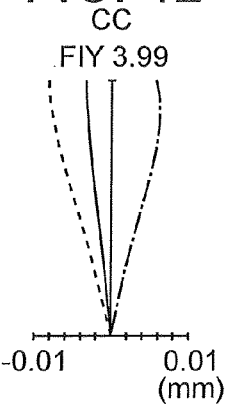

SA
FNO 3.517

AS
FIY 3.99

DT
FIY 3.99

CC
FIY 3.99

SA
FNO 4.361

AS
FIY 3.99

DT
FIY 3.99

CC
FIY 3.99

SA
FNO 4.268

AS
FIY 3.99

DT
FIY 3.99

CC
FIY 3.99

SA
FNO 3.413

AS
FIY 3.99

DT
FIY 3.99

CC
FIY 3.99

SA
FNO 4.277

AS
FIY 3.99

DT
FIY 3.99

CC
FIY 3.99

SA
FNO 4.622

AS
FIY 3.99

DT
FIY 3.99

CC
FIY 3.99

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2011-160763 filed on Jul. 22, 2011; the entire contents of which are incorporated herein by reference.

BACKGROUND OF THE INVENTION

1. Field of the Invention

The present invention relates to a zoom lens, in particular to a zoom lens with a bent optical path and an image pickup apparatus using the same.

2. Description of the Related Art

In late years, the number of pixels and sensitivity of image pickup elements used in compact cameras have been increasing. Consequently, the size of image pickup elements used in compact cameras have been increasing. With increases in the size (and the number of pixels) of image pickup elements, size reduction and slimming of optical systems of compact cameras are required. There have been developed, as such a small-sized, slim optical system, an optical system having a prism provided in the optical path of the optical system to bend the optical path for slimming (see the specification of Japanese Patent No. 4496460).

The specification of Japanese Patent No. 4496460 discloses a zoom lens composed of a first lens group having a positive refractive power and fixed during zooming, a second lens group having a negative refractive power, a third lens group having a positive refractive power, a fourth lens group having a positive refractive power, a fifth lens group having a negative refractive power, and a sixth lens group and having a reflecting member for bending the optical path provided in the first lens group.

SUMMARY OF THE INVENTION

A zoom lens according to the present invention comprises, in order from the object side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power, wherein
during zooming from the wide angle end to the telephoto end, the first lens group, the third lens group, and the sixth lens group are fixed, the second lens group, the fourth lens group, and the fifth lens group move,
the first lens group comprises a reflecting optical element that bends the optical path,
the second lens group comprises, in order from the object side, a negative lens and a cemented lens made up of a negative lens and a positive lens,
the third lens group comprises an aperture stop,
the fourth lens group comprises, in order from the object side, a positive lens and a negative lens, and
the fifth lens group comprises a negative lens.

An image pickup apparatus according to the present invention comprises the above-described zoom lens and an image pickup element.

BRIEF DESCRIPTION OF THE DRAWINGS

FIGS. 2A, 2B, 2C, 2D, 2E, 2F, 2G, 2H, 2I, 2J, 2K, and 2L are aberration diagrams of the zoom lens according to the first embodiment in the state in which the zoom lens is focused on an object point at infinity;

FIGS. 4A, 4B, 4C, 4D, 4E, 4F, 4G, 4H, 4I, 4J, 4K, and 4L are aberration diagrams of the zoom lens according to the second embodiment in the state in which the zoom lens is focused on an object point at infinity;

FIG. 15A is a front view of the cellular phone 400, FIG. 15B is a side view of the cellular phone 400, and FIG. 15C is a cross sectional view of the taking optical system 405.

DETAILED DESCRIPTION OF THE INVENTION

Figure 1A:
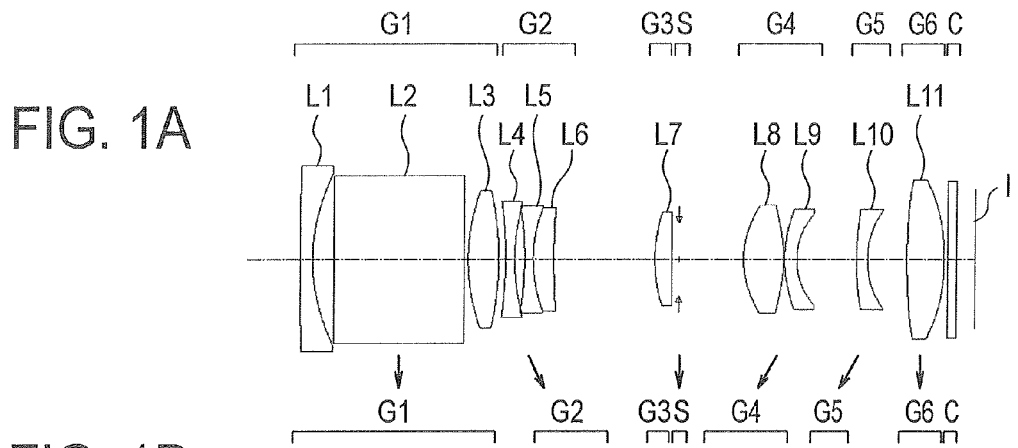
FIGS. 1A, 1B, and 1C are cross sectional views taken along the optical axis, showing the construction of a zoom lens according to a first embodiment of the present invention in the state in which the zoom lens is focused on an object point at infinity, respectively at the wide angle end, in an intermediate focal length state, and at the telephoto end.

A zoom lens according to a mode of the invention will be described. The zoom lens according to this mode includes, in order from the object side, a first lens group having a positive refractive power, a second lens group having a negative refractive power, a third lens group having a positive refractive power, a fourth lens group having a positive refractive power, a fifth lens group having a negative refractive power, and a sixth lens group having a positive refractive power. During zooming from the wide angle end to the telephoto end, the first lens group, the third lens group, and the sixth lens group are fixed, and the second lens group, fourth lens group, and the fifth lens group move. The first lens group includes a reflecting optical element that bends the optical path. The second lens group includes, in order from the object side, a negative lens and a cemented lens made up of a negative lens and a positive lens. The third lens group includes an aperture stop. The fourth lens group includes, in order from the object side, a positive lens and a negative lens. The fifth lens group includes a negative lens. In addition, the zoom lens according to this mode satisfies the following conditional expressions (1) and (2):

$$0.5 \leq f1/\sqrt{(fw \cdot ft)} \leq 2.0 \quad (1), \text{and}$$

$$1.0 \leq pri/IH \leq 2.5 \quad (2),$$

where f1 is the focal length of the first lens group, fw is the focal length of the entire zoom lens system at the wide angle end, ft is the focal length of the entire zoom lens system at the telephoto end, pri is the thickness of the reflecting optical element, and IH is the largest image height on the image plane.

The zoom lens according to this mode includes six lens groups. Thus, the required refractive power can be distributed to a number of lens groups. In addition, the number of lenses in each lens group can be made small while keeping required optical performance. Therefore, the overall length of the optical system can be made small.

In the zoom lens according to this mode, in particular, the fourth lens group includes two lenses, and the fifth lens group is moved during zooming. With this configuration, zooming and focusing can be performed while keeping chromatic aberrations and curvature of field small without requiring a large space.

The first lens group has a positive refractive power and includes a reflecting optical element that bends the optical path. The positive refractive power of the first lens group contributes to reduction of the F-number and facilitates reduction in the overall length of the optical system. Having the reflecting optical element (e.g. a prism) that bends the optical path in the first lens group enables slimming of the optical system.

The second lens group includes, in order from the object side, a negative lens and a cemented lens made up of a negative lens and a positive lens. With this configuration, the second lens group can provide the magnification change with a small amount of movement and contribute to reduction of chromatic aberration of magnification and axial chromatic aberration. It is preferred that the aforementioned positive lens be made of a material having a high refractive index and high dispersion.

The fourth lens group includes, in order from the object side, a positive lens and a negative lens. This configuration facilitates reduction of aberrations and reduction in the overall length of the optical system.

The fifth lens group includes a negative lens. This configuration allows size reduction and slimming of the optical system. Using an aspheric lens as the aforementioned negative lens can further facilitates reduction of astigmatism generated upon focusing.

The zoom lens according to this mode satisfies conditional expressions (1) and (2) presented above.

If the upper limit of conditional expression (1) is exceeded, the refractive power of the first lens group will be unduly low in relation to the zoom ratio. Then, the height of rays (ray height) passing through the first lens group will be high. This will necessitate a large prism and large overall length. Moreover, a large F-number (or slow lens system) will result. On the other hand, if the lower limit of conditional expression (1) is not reached, the refractive power of the first lens group will be unduly high in relation to the zoom ratio. Then, large chromatic aberration of magnification and astigmatism will be generated, and it will be difficult to correct these aberrations.

If the upper limit of conditional expression (2) is exceeded, the first lens group is necessitated to be large, making the height of rays incident on the first lens group high. Consequently, it will be difficult to make the optical system small. Moreover, it will be difficult to correct chromatic aberration of magnification and astigmatism. On the other hand, if the lower limit of conditional expression (2) is not reached, the angle of view at the wide angle end will be small, and the F-number at the telephoto end will become large (resulting in slow optical system). In the case where the image pickup element is disposed at the position of the image plane, IH is the diagonal length of the image pickup surface of the image pickup element.

It is more preferred that the following conditional expression (1') be satisfied instead of conditional expression (1):

$$0.7 \leq f1/\sqrt{(fw \cdot ft)} \leq 1.6 \quad (1').$$

It is still more preferred that the following conditional expression (1") be satisfied instead of conditional expression (1):

$$1.1 \leq f1/\sqrt{(fw \cdot ft)} \leq 1.3 \quad (1").$$

It is more preferred that the following conditional expression (2') be satisfied instead of conditional expression (2):

$$1.5 \leq pri/IH \leq 2.2 \quad (2').$$

It is still more preferred that the following conditional expression (2") be satisfied instead of conditional expression (2):

$$1.8 \leq pri/IH \leq 2.0 \quad (2").$$

The zoom lens according to this mode satisfies the following conditional expressions (7) and (8):

$$0.5 \leq f2\_a/f2 \leq 3.0 \quad (7), \text{and}$$

$$0.5 \leq f2\_b/f2 \leq 3.0 \quad (8),$$

where f2 is the focal length of the second lens group, f2_a is the focal length of the negative lens located closest to the object side in the second lens group, and f2_b is the focal length of the negative lens located closest to the image side in the second lens group.

If the upper limits of conditional expressions (7) and (8) are exceeded, the refractive power of the negative lenses in the second lens group will become unduly low, necessitating a large amount of movement of the second lens group. Then, it will be impossible to provide a sufficient space for movement of the second lens group.

If the lower limits of conditional expressions (7) and (8) are not reached, the refractive power of the negative lenses in the second lens group will become unduly low, leading to a large Petzval sum. In consequence, curvature of field will result.

It is more preferred that the following conditional expression (7') be satisfied instead of conditional expression (7):

$$0.7 \leq f2\_a/f2 \leq 2.5 \qquad (7').$$

It is more preferred that the following conditional expression (8') be satisfied instead of conditional expression (8):

$$0.8 \leq f2\_b/f2 \leq 2.0 \qquad (8').$$

In the zoom lens according to this mode, it is preferred that the third lens group includes one positive lens located on the object side of the aperture stop and that the following conditional expression (3) is satisfied:

$$1.0 \leq f3/\sqrt{(fw \cdot ft)} \leq 4.0 \qquad (3),$$

where f3 is the focal length of the third lens group, fw is the focal length of the entire zoom lens system at the wide angle end, and ft is the focal length of the entire zoom lens system at the telephoto end.

Having a positive lens located on the object side of the aperture stop can make the ray height low. Moreover, since the number of lenses in the third lens group is one, it is space-saving with respect to the direction along the optical axis. In consequence, the height of rays incident on the lens group on the image side of the aperture stop can be made low. Therefore, it is possible to control coma while making the optical system small (or slim).

If the upper limit of conditional expression (3) is exceeded, the height of rays incident on the fourth lens group will be high. Then, coma will be generated in the fourth lens group. On the other hand, if the lower limit of conditional expression (3) is not reached, the refractive power of the third lens group will become unduly high. Then, coma will be generated in the third lens group.

It is more preferred that the following conditional expression (3') be satisfied instead of conditional expression (3):

$$1.2 \leq f3/\sqrt{(fw \cdot ft)} \leq 3.0 \qquad (3').$$

It is still more preferred that the following conditional expression (3") be satisfied instead of conditional expression (3):

$$1.4 \leq f3/\sqrt{(fw \cdot ft)} \leq 2.6 \qquad (3").$$

In the zoom lens according to this mode, it is preferred that the positive lens in the fourth lens group be a bi-aspheric lens and that the following conditional expression (4) be satisfied:

$$0.5 \leq f4/\sqrt{(fw \cdot ft)} \leq 2.0 \qquad (4),$$

where f4 is the focal length of the fourth lens group, fw is the focal length of the entire zoom lens system at the wide angle end, and ft is the focal length of the entire zoom lens system at the telephoto end.

In the fourth lens group including a positive lens and a negative lens, it is preferred that the positive lens be an aspheric lens that are aspheric on both sides. This can facilitate reduction of coma.

If the upper limit of conditional expression (4) is exceeded, a large amount of movement of the fourth lens group will be necessitated. This leads to a large overall length of the optical system. On the other hand, if the lower limit of conditional expression (4) is not reached, the refractive power of the fourth lens group will become unduly high. Then, it will be difficult to correct coma, axial chromatic aberration, and chromatic aberration of magnification generated in the fourth lens group.

It is more preferred that the following conditional expression (4') be satisfied instead of conditional expression (4):

$$0.7 \leq f4/\sqrt{(fw \cdot ft)} \leq 1.5 \qquad (4').$$

It is still more preferred that the following conditional expression (4") be satisfied instead of conditional expression (4):

$$0.8 \leq f4/\sqrt{(fw \cdot ft)} \leq 1.1 \qquad (4").$$

It is preferred that the negative lens in the fourth lens group be a meniscus lens. This can lead to a small Petzval sum.

In the zoom lens according to this mode, it is preferred that the following conditional expression (5) be satisfied:

$$-2.0 \leq f4\_b/\sqrt{(fw \cdot ft)} \leq -0.1 \qquad (5),$$

where f4_b is the focal length of negative lens in the fourth lens group, fw is the focal length of the entire zoom lens system at the wide angle end, and ft is the focal length of the entire zoom lens system at the telephoto end.

The third lens group makes the ray height in the fourth lens group low. Therefore, it is preferred that the image side negative lens in the fourth lens group be designed to have an appropriate refractive power. Satisfying conditional expression (5) leads to correction of the Petzval sum while reducing coma.

If the upper limit of conditional expression (5) is exceeded, it will be difficult to correct coma. On the other hand, if the lower limit of conditional expression (5) is not reached, it will be difficult to correct the Petzval sum, leading to curvature of field.

It is more preferred that the following conditional expression (5') be satisfied instead of conditional expression (5):

$$-1.5 \leq f4\_b/\sqrt{(fw \cdot ft)} \leq -0.3 \qquad (5').$$

It is still more preferred that the following conditional expression (5") be satisfied instead of conditional expression (5):

$$-1.1 \leq f4\_b/\sqrt{(fw \cdot ft)} \leq -0.5 \qquad (5").$$

In the zoom lens according to this mode, it is preferred that the fifth lens group move from the image side toward the object side during zooming from the wide angle end to the telephoto end, that focusing be performed only by the fifth lens group, and that the following conditional expression (6) be satisfied:

$$-2 \leq f5/\sqrt{(fw \cdot ft)} \leq -0.1 \qquad (6),$$

where f5 is the focal length of the fifth lens group, fw is the focal length of the entire zoom lens system at the wide angle end, and ft is the focal length of the entire zoom lens system at the telephoto end.

By moving the fifth lens group from the image plane side to the object side during zooming from the wide angle end to the telephoto end, a space for focusing can be provided with reduced image plane variation. By performing focusing by the fifth lens group, sufficient optical performance can be ensured even in the very short object distance range.

If the lower limit of conditional expression (6) is not reached, an increase in the amount of movement of the fifth lens group will be necessitated. Then, a space for allowing the movement of the fifth lens group for focusing cannot be provided. On the other hand, if the upper limit of conditional expression (5) is exceeded, it will be difficult to correct coma. In addition, it will be difficult to control image plane variation with focusing.

It is more preferred that the following conditional expression (6') be satisfied instead of conditional expression (6):

$$-1.8 \leq f5/\sqrt{(fw \cdot ft)} \leq -0.5 \qquad (6').$$

It is still more preferred that the following conditional expression (6") be satisfied instead of conditional expression (6):

$$-1.6 \leq f5/\sqrt{(fw \cdot ft)} \leq -0.6 \qquad (6''). $$

It is preferred that an image pickup apparatus according to this mode be equipped with the zoom lens described above and an image pickup element. Thus, there can be provided an image pickup apparatus using a compact zoom lens with well-corrected aberrations (in particular astigmatism) in the peripheral region, in particular a zoom lens with a bent optical path, which is advantageous for slimming of the apparatus.

In the following, embodiments of the zoom lens and the image pickup apparatus will be described in detail with reference to the drawings. It should be understood that the embodiments are not intended to limit the scope of the present invention. In the following description, the sign (positive/negative) of the refractive power is determined based on the paraxial radius of curvature. In numerical data of the embodiments, r1 and d1, and r24 and d23 show virtual surfaces and their positions. Although these reference signs are seen in the drawings, the virtual planes are not illustrated.

Figure 1B:
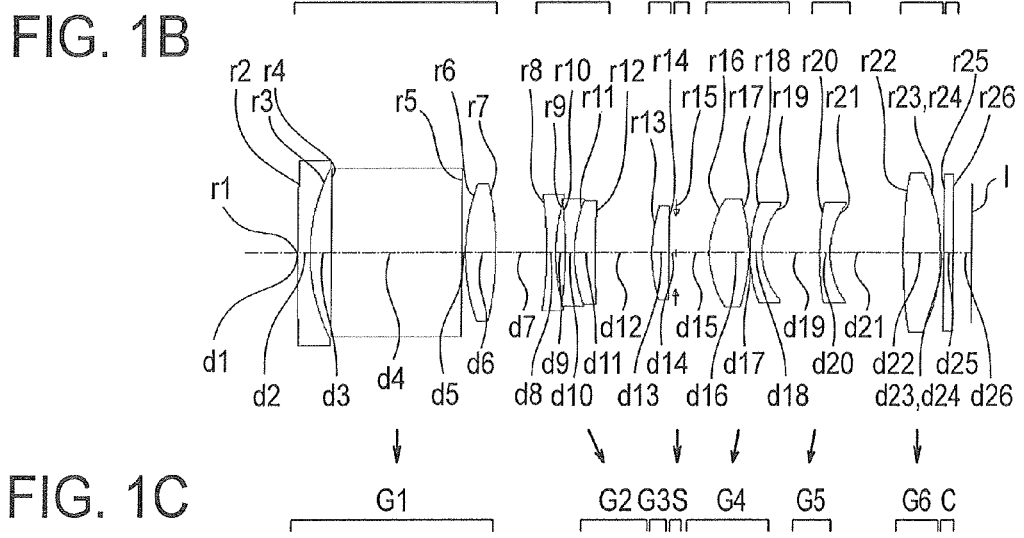
Figure 1C:
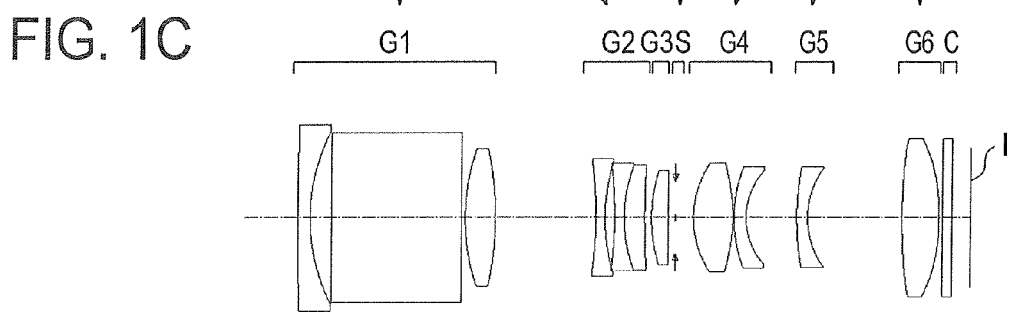

A zoom lens according to a first embodiment will be described. FIGS. 1A, 1B, and 1C are cross sectional views of the zoom lens according to the first embodiment of the present invention taken along the optical axis in the state in which the zoom lens is focused on an object point at infinity, where FIG. 1A shows the state of the zoom lens at the wide angle end, FIG. 1B shows the state of the zoom lens in an intermediate focal length state, and FIG. 1C shows the state of the zoom lens at the telephoto end.

FIGS. 2A to 2L are aberration diagrams of the zoom lens according to the first embodiment in the state in which the zoom lens is focused on an object point at infinity. FIGS. 2A, 2B, 2C, and 2D respectively show spherical aberration (SA), astigmatism (AS), distortion (DT), and chromatic aberration of magnification (CC) of the zoom lens at the wide angle end. FIGS. 2E, 2F, 2G, and 2H respectively show spherical aberration (SA), astigmatism (AS), distortion (DT), and chromatic aberration of magnification (CC) of the zoom lens in the intermediate focal length state. FIGS. 2I, 2J, 2K, and 2L respectively show spherical aberration (SA), astigmatism (AS), distortion (DT), and chromatic aberration of magnification (CC) of the zoom lens at the telephoto end.

In aberration diagrams, "FIY" represents the largest image height. The same symbol in the aberration diagrams is also used in second to fourth embodiment described later.

As shown in FIGS. 1A, 1B, and 1C, the zoom lens according to the first embodiment includes, in order from the object side, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power. In the cross sectional views of the zoom lenses according to the embodiments, a cover glass C and the image pickup surface I of an image pickup element are also illustrated. The zoom lenses according to the embodiments have an aperture stop S provided in the third lens group G3. The zoom lenses use a prism as a reflecting optical element for bending the optical path.

The first lens group G1 is composed of a negative meniscus alens L1 having a convex surface directed toward the object side, a prism L2, and a biconvex positive lens L3.

The second lens group G2 is composed, in order from the object side, of a biconcave negative lens L4, a biconcave negative lens L5, and a positive meniscus lens L6 having a convex surface directed toward the object side. The biconcave negative lens L5 and the positive meniscus lens L6 having a convex surface directed toward the object side are cemented together to constitute a cemented lens.

The third lens group G3 is composed of a plano-convex lens L7 having a convex surface directed toward the object side and an aperture stop S. The plano-convex lens L7 is disposed on the object side of the aperture stop S.

The fourth lens group G4 is composed, in order from the object side, of a biconvex positive lens L8 and a negative meniscus lens L9 having a convex surface directed toward the object side.

The fifth lens group G5 is composed of a negative meniscus lens L10 having a convex surface directed toward the object side.

The sixth lens group G6 is composed of a biconvex positive lens L11.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 moves toward the object side, and the sixth lens group G6 is fixed.

There are seven aspheric surfaces, which include both surfaces of the biconvex positive lens L3 in the first lens group G1, the object side surface of the plano-convex lens L7 in the third lens group G3, both surfaces of the biconvex positive lens L8 in the fourth lens group G4, and both surfaces of the biconvex positive lens L11 in the sixth lens group G6.

Figure 3A:
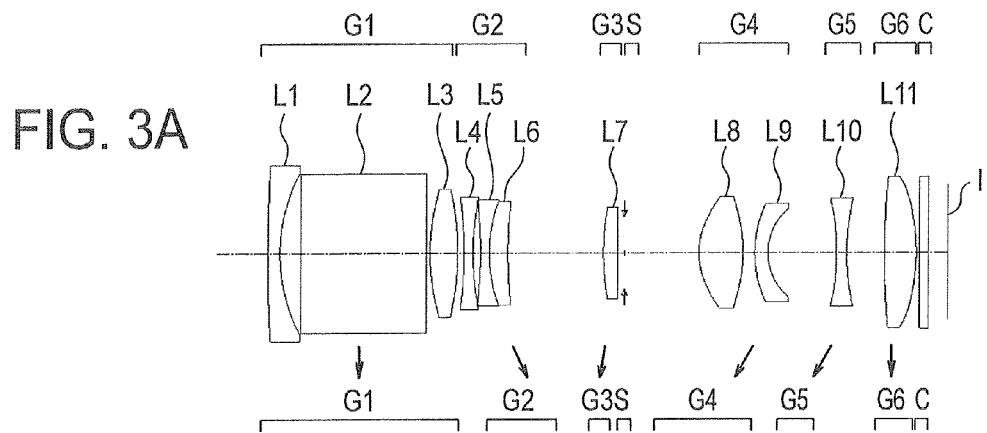
FIGS. 3A, 3B, and 3C are cross sectional views taken along the optical axis, showing the construction of a zoom lens according to a second embodiment of the present invention in the state in which the zoom lens is focused on an object point at infinity, respectively at the wide angle end, in an intermediate focal length state, and at the telephoto end.
Figure 3B:
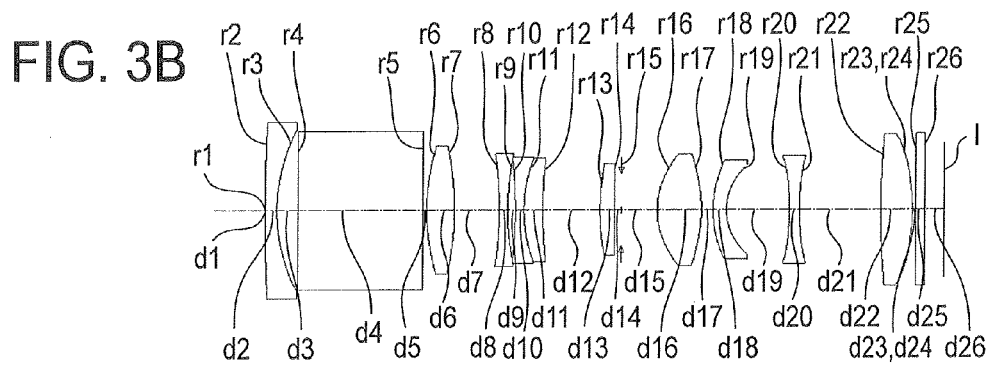
Figure 3C:
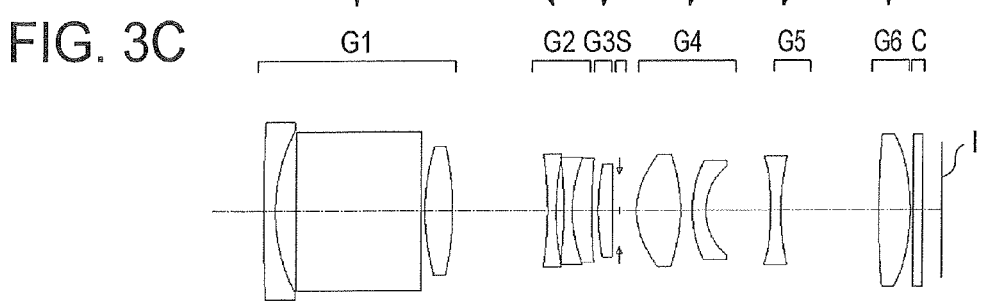

Next, a zoom lens according to a second embodiment will be described. FIGS. 3A, 3B, and 3C are cross sectional views of the zoom lens according to the second embodiment of the present invention taken along the optical axis in the state in which the zoom lens is focused on an object point at infinity, where FIG. 3A shows the state of the zoom lens at the wide angle end, FIG. 3B shows the state of the zoom lens in an intermediate focal length state, and FIG. 3C shows the state of the zoom lens at the telephoto end.

FIGS. 4A to 4L are aberration diagrams of the zoom lens according to the second embodiment in the state in which the zoom lens is focused on an object point at infinity. FIGS. 4A, 4B, 4C, and 4D respectively show spherical aberration (SA), astigmatism (AS), distortion (DT), and chromatic aberration of magnification (CC) of the zoom lens at the wide angle end. FIGS. 4E, 4F, 4G, and 4H respectively show spherical aberration (SA), astigmatism (AS), distortion (DT), and chromatic aberration of magnification (CC) of the zoom lens in the intermediate focal length state. FIGS. 4I, 4J, 4K, and 4L respectively show spherical aberration (SA), astigmatism (AS), distortion (DT), and chromatic aberration of magnification (CC) of the zoom lens at the telephoto end.

In aberration diagrams, "FIY" represents the largest image height.

As shown in FIGS. 3A, 3B, and 3C, the zoom lens according to the second embodiment includes, in order from the object side, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power.

The first lens group G1 is composed of a negative meniscus lens L1 having a convex surface directed toward the object side, a prism L2, and a biconvex positive lens L3.

The second lens group G2 is composed, in order from the object side, of a biconcave negative lens L4, a biconcave negative lens L5, and a positive meniscus lens L6 having a convex surface directed toward the object side. The biconcave negative lens L5 and the positive meniscus lens L6 having a convex surface directed toward the object side are cemented together to constitute a cemented lens.

The third lens group G3 is composed of a plano-convex lens L7 having a convex surface directed toward the object side and an aperture stop S. The plano-convex lens L7 is disposed on the object side of the aperture stop S.

The fourth lens group G4 is composed, in order from the object side, of a biconvex positive lens L8 and a negative meniscus lens L9 having a convex surface directed toward the object side.

The fifth lens group G5 is composed of a biconcave negative lens L10.

The sixth lens group G6 is composed of a biconvex positive lens L11.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 moves toward the object side, and the sixth lens group G6 is fixed.

There are sixth aspheric surfaces, which include the object side surface of the biconvex positive lens L3 in the first lens group G1, the object side surface of the plano-convex lens L7 in the third lens group G3, both surfaces of the biconvex positive lens L8 in the fourth lens group G4, the object side surface of the biconcave negative lens L10 in the fifth lens group G5, and the image side surface of the biconvex positive lens L11 in the sixth lens group G6.

Figure 5A:
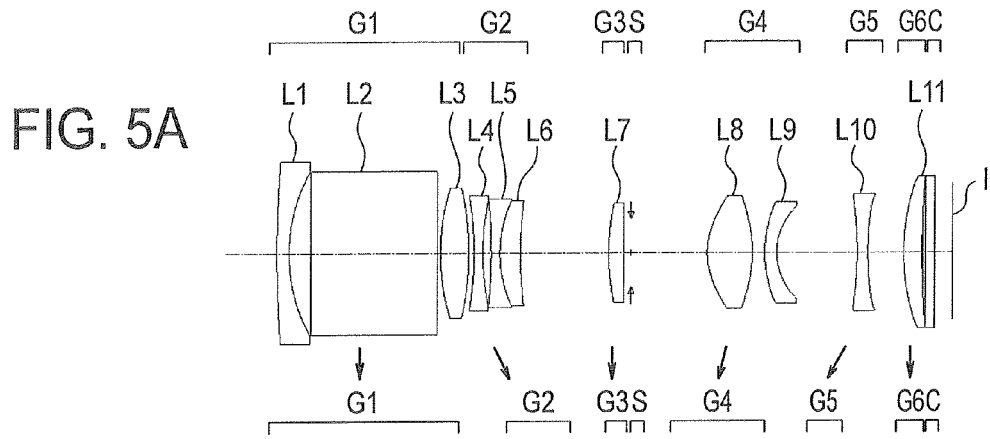
FIGS. 5A, 5B, and 5C are cross sectional views taken along the optical axis, showing the construction of a zoom lens according to a third embodiment of the present invention in the state in which the zoom lens is focused on an object point at infinity, respectively at the wide angle end, in an intermediate focal length state, and at the telephoto end.
Figure 5B:
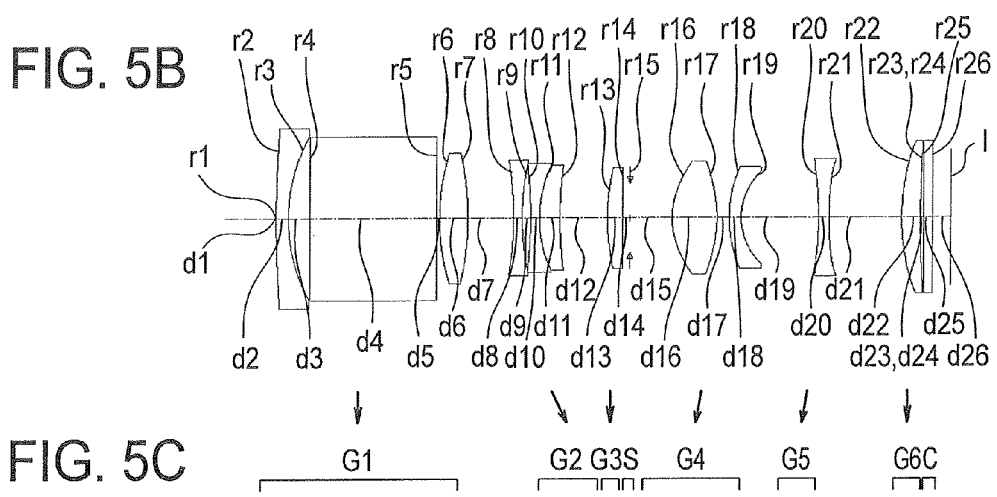
Figure 5C:
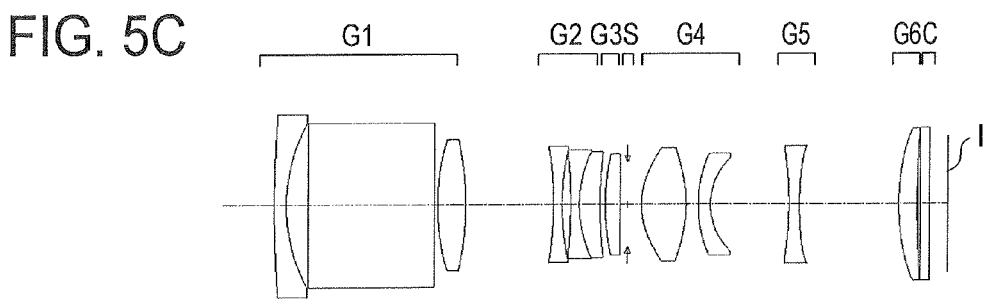
Figure 6A:
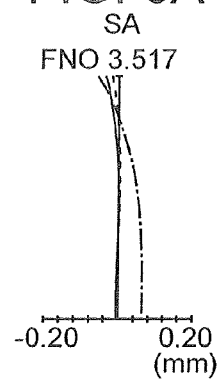
FIGS. 6A, 6B, 6C, 6D, 6E, 6F, 6G, 6H, 6I, 6J, 6K, and 6L are aberration diagrams of the zoom lens according to the third embodiment in the state in which the zoom lens is focused on an object point at infinity.
Figure 6B:
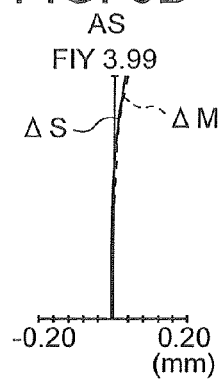
Figure 6C:
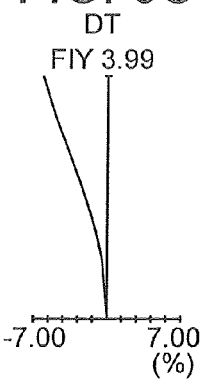
Figure 6D:
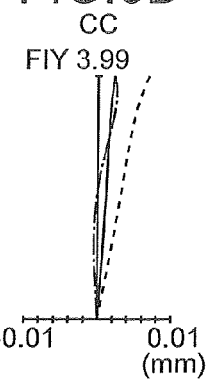
Figure 6E:
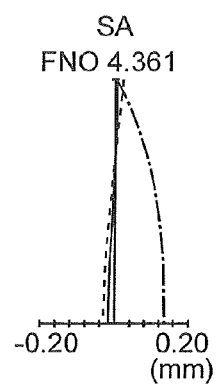
Figure 6F:
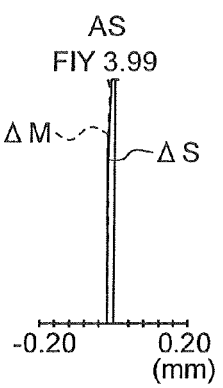
Figure 6G:
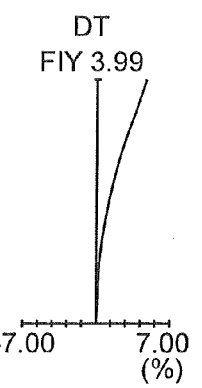
Figure 6H:
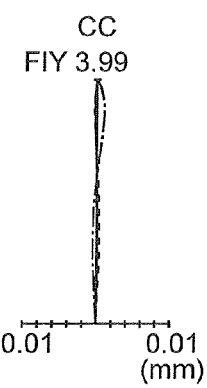
Figure 6I:
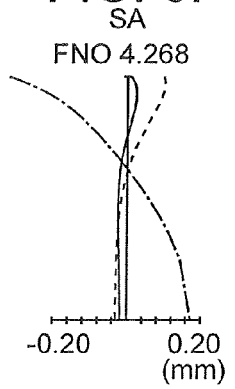
Figure 6J:
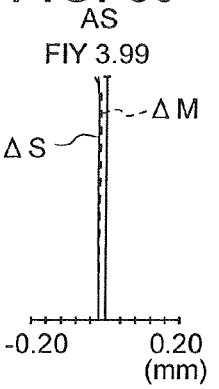
Figure 6K:
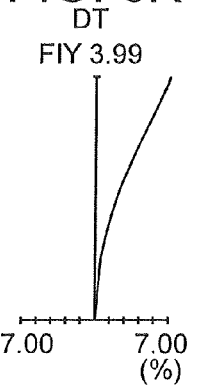
Figure 6L:
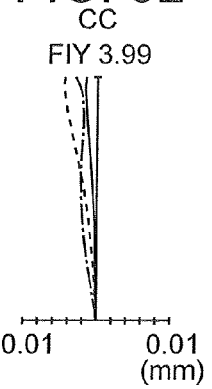

Next, a zoom lens according to a third embodiment will be described. FIGS. 5A, 5B, and 5C are cross sectional views of the zoom lens according to the first embodiment of the present invention taken along the optical axis in the state in which the zoom lens is focused on an object point at infinity, where FIG. 5A shows the state of the zoom lens at the wide angle end, FIG. 5B shows the state of the zoom lens in an intermediate focal length state, and FIG. 5C shows the state of the zoom lens at the telephoto end.

FIGS. 6A to 6L are aberration diagrams of the zoom lens according to the third embodiment in the state in which the zoom lens is focused on an object point at infinity. FIGS. 6A, 6B, 6C, and 6D respectively show spherical aberration (SA), astigmatism (AS), distortion (DT), and chromatic aberration of magnification (CC) of the zoom lens at the wide angle end. FIGS. 6E, 6F, 6G, and 6H respectively show spherical aberration (SA), astigmatism (AS), distortion (DT), and chromatic aberration of magnification (CC) of the zoom lens in the intermediate focal length state. FIGS. 6I, 6J, 6K, and 6L respectively show spherical aberration (SA), astigmatism (AS), distortion (DT), and chromatic aberration of magnification (CC) of the zoom lens at the telephoto end.

In aberration diagrams, "FIY" represents the largest image height.

As shown in FIGS. 5A, 5B, and 5C, the zoom lens according to the third embodiment includes, in order from the object side, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power.

The first lens group G1 is composed of a negative meniscus lens L1 having a convex surface directed toward the object side, a prism L2, and a biconvex positive lens L3.

The second lens group G2 is composed, in order from the object side, of a biconcave negative lens L4, a biconcave negative lens L5, and a positive meniscus lens L6 having a convex surface directed toward the object side. The biconcave negative lens L5 and the positive meniscus lens L6 having a convex surface directed toward the object side are cemented together to constitute a cemented lens.

The third lens group G3 is composed of a plano-convex lens L7 having a convex surface directed toward the object side and an aperture stop S. The plano-convex lens L7 is disposed on the object side of the aperture stop S.

The fourth lens group G4 is composed, in order from the object side, of a biconvex positive lens L8 and a negative meniscus lens L9 having a convex surface directed toward the object side.

The fifth lens group G5 is composed of a biconcave negative lens L10.

The sixth lens group G6 is composed of a positive meniscus lens L11 having a convex surface directed toward the object side.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 moves toward the object side, and the sixth lens group G6 is fixed.

There are seven aspheric surfaces, which include the object side surface of the biconvex positive lens L3 in the first lens group G1, the object side surface of the plano-convex lens L7 in the third lens group G3, both surfaces of the biconvex positive lens L8 in the fourth lens group G4, both surfaces of the biconcave negative lens L10 in the fifth lens group G5, and the object side surface of the positive meniscus lens having a convex surface directed toward the object side in the sixth lens group G6.

Figure 7A:
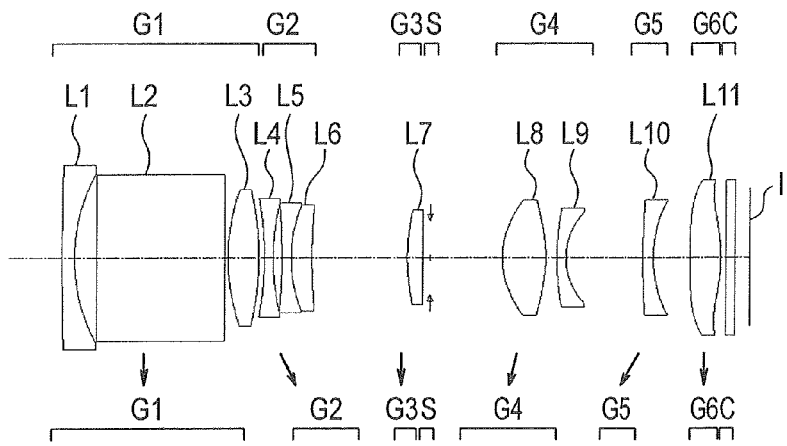
FIGS. 7A, 7B, and 7C are cross sectional views taken along the optical axis, showing the construction of a zoom lens according to a fourth embodiment of the present invention in the state in which the zoom lens is focused on an object point at infinity, respectively at the wide angle end, in an intermediate focal length state, and at the telephoto end.
Figure 7B:
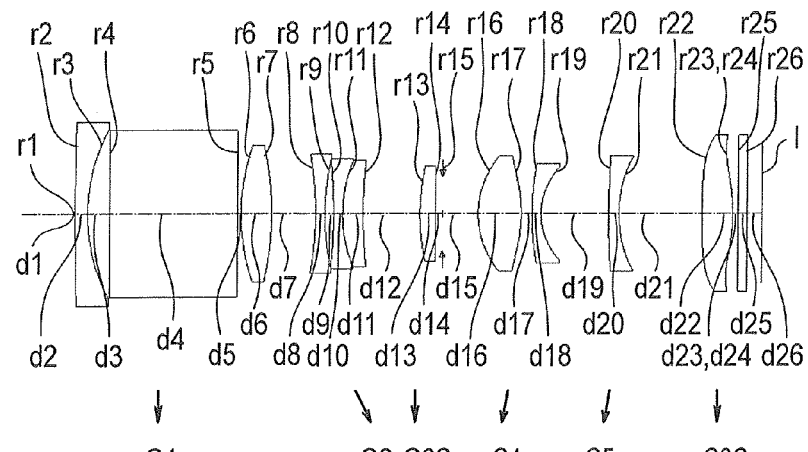
Figure 7C:
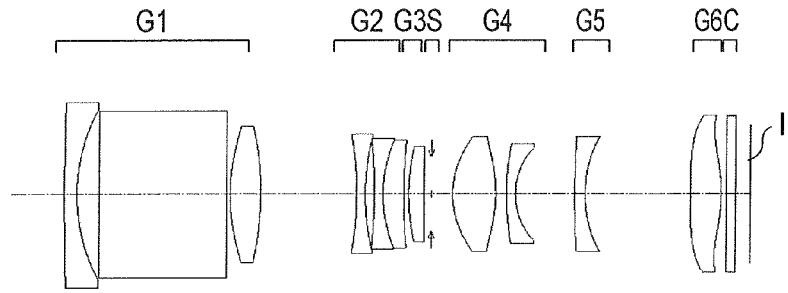
Figure 8A:
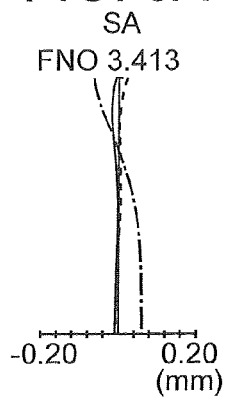
FIGS. 8A, 8B, 8C, 8D, 8E, 8F, 8G, 8H, 8I, 8J, 8K, and 8L are aberration diagrams of the zoom lens according to the fourth embodiment in the state in which the zoom lens is focused on an object point at infinity.
Figure 8B:
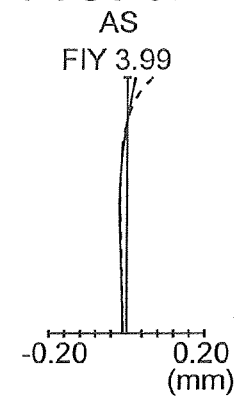
Figure 8C:
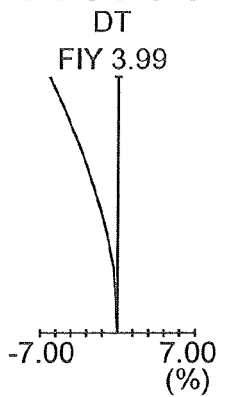
Figure 8D:
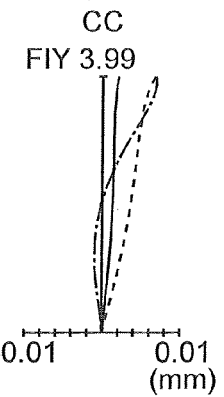
Figure 8E:
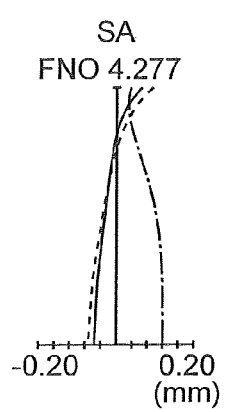
Figure 8F:
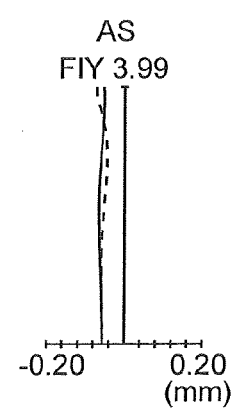
Figure 8G:
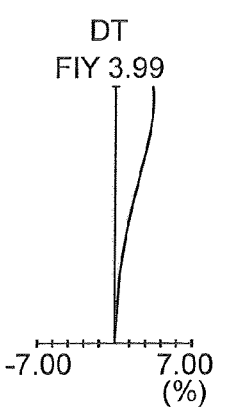
Figure 8H:
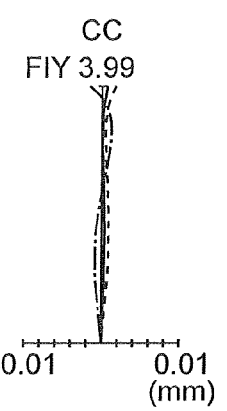
Figure 8I:
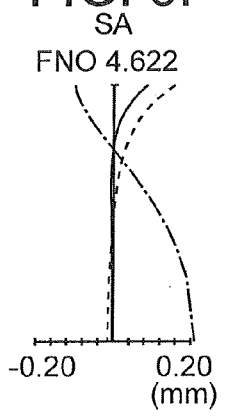
Figure 8J:
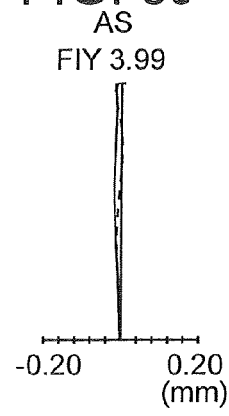
Figure 8K:
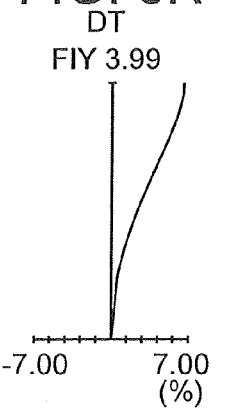
Figure 8L:
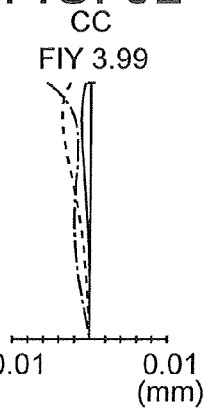

Next, a zoom lens according to a fourth embodiment will be described. FIGS. 7A, 7B, and 7C are cross sectional views of the zoom lens according to the fourth embodiment of the present invention taken along the optical axis in the state in which the zoom lens is focused on an object point at infinity, where FIG. 7A shows the state of the zoom lens at the wide angle end, FIG. 7B shows the state of the zoom lens in an intermediate focal length state, and FIG. 7C shows the state of the zoom lens at the telephoto end.

FIGS. 8A to 8L are aberration diagrams of the zoom lens according to the fourth embodiment in the state in which the zoom lens is focused on an object point at infinity. FIGS. 8A, 8B, 8C, and 8D respectively show spherical aberration (SA), astigmatism (AS), distortion (DT), and chromatic aberration of magnification (CC) of the zoom lens at the wide angle end. FIGS. 8E, 8F, 8G, and 8H respectively show spherical aberration (SA), astigmatism (AS), distortion (DT), and chromatic aberration of magnification (CC) of the zoom lens in the intermediate focal length state. FIGS. 8I, 8J, 8K, and 8L respectively show spherical aberration (SA), astigmatism (AS), distortion (DT), and chromatic aberration of magnification (CC) of the zoom lens at the telephoto end.

In aberration diagrams, "FIY" represents the largest image height.

As shown in FIGS. 7A, 7B, and 7C, the zoom lens according to the seventh embodiment includes, in order from the object side, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power.

The first lens group G1 is composed of a negative meniscus lens L1 having a convex surface directed toward the object side, a prism L2, and a biconvex positive lens L3.

The second lens group G2 is composed, in order from the object side, of a biconcave negative lens L4, a biconcave negative lens L5, and a positive meniscus lens L6 having a convex surface directed toward the object side. The biconcave negative lens L5 and the positive meniscus lens L6 having a convex surface directed toward the object side are cemented together to constitute a cemented lens.

The third lens group G3 is composed of a plano-convex lens L7 and an aperture stop S. The plano-convex lens L7 is disposed on the object side of the aperture stop S.

The fourth lens group G4 is composed, in order from the object side, of a biconvex positive lens L8 and a negative meniscus lens L9 having a convex surface directed toward the object side.

The fifth lens group G5 is composed of a negative meniscus lens L10 having a convex surface directed toward the object side.

The sixth lens group G6 is composed of a biconvex positive lens L11.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 moves toward the object side, and the sixth lens group G6 is fixed.

There are eight aspheric surfaces, which include the object side surface of the biconvex positive lens L3 in the first lens group G1, the object side surface of the plano-convex lens L7 in the third lens group G3, both surfaces of the biconvex positive lens L8 in the fourth lens group G4, both surfaces of the negative meniscus lens having a convex surface directed toward the object side in the fifth lens group G5, and both surfaces of the biconvex positive lens L11 in the sixth lens group G6.

In the following numerical data of the optical members that constitute the zoom lens according to each of the above-described embodiments will be presented. In numerical data of the embodiments, the radius of curvature r1, r2 . . . of each lens surface, the thickness or air gap d1, d2, . . . of each lens or between adjacent lenses, the refractive index nd1, nd2, . . . with respect to the d-line of each lens, and the Abbe constant vd1, vd2, . . . of each lens are presented. The lens surfaces having a surface number with an asterisk "*" are aspheric surfaces. In the zoom data, the focal length refers to the focal length of the entire zoom lens system, FNO. represents the F-number, ω represents the half angle of view, and fb represents the back focus. The columns in the zoom data are, from left to right, for the wide angle end WE, the intermediate focal length state ST2, the telephoto end TE, a state ST1 between the wide angle end and the intermediate focal length state, and a state ST3 between the intermediate focal length state and the telephoto end.

The shape of aspheric surfaces is represented by the following equation in the coordinate system with a z-axis parallel to the optical axis and y-axis perpendicular to the optical axis:

$$z=(y^2/r)/[1+\{1-(1+K)(y/r)^2\}^{1/2}]+A4y^4+A6y^6+A8y^8+A10y^{10},$$

where K is a conic coefficient, A4, A6, A8, and A10 are aspheric coefficients. In the numerical data concerning the aspheric coefficients, the expression "e-n" stands for "×10$^{-n}$".

The symbols described above are used in all the numerical data of the embodiments presented in the following.

Example 1

| Unit mm | | | | |
|---|---|---|---|---|
| Surface data | | | | |
| Surface no. | r | d | nd | vd |
| Object plane | ∞ | ∞ | | |
| 1 | ∞ | 0.00 | | |
| 2 | 241.920 | 0.70 | 1.94595 | 17.98 |
| 3 | 11.157 | 1.20 | | |
| 4 | ∞ | 7.40 | 1.90366 | 31.32 |
| 5 | ∞ | 0.20 | | |
| 6* | 11.463 | 1.74 | 1.80610 | 40.88 |
| 7* | −18.110 | Variable | | |
| 8 | −23.345 | 0.50 | 1.88300 | 40.76 |
| 9 | 11.119 | 0.56 | | |
| 10 | −22.303 | 0.50 | 1.80041 | 46.56 |
| 11 | 8.361 | 1.17 | 1.92286 | 18.90 |
| 12 | 52.372 | Variable | | |
| 13* | 8.409 | 0.97 | 1.53367 | 55.82 |
| 14 | ∞ | 0.40 | | |
| 15(Stop) | ∞ | Variable | | |
| 16* | 5.124 | 2.27 | 1.57120 | 67.93 |
| 17* | −8.214 | 0.05 | | |
| 18 | 7.873 | 0.69 | 1.90936 | 20.78 |
| 19 | 4.000 | Variable | | |
| 20 | 16.931 | 0.60 | 1.85596 | 20.19 |
| 21 | 4.835 | Variable | | |
| 22* | 36.404 | 2.11 | 1.63493 | 23.90 |
| 23* | −14.649 | 0.00 | | |
| 24 | ∞ | 0.20 | | |
| 25 | ∞ | 0.50 | 1.51633 | 64.14 |
| 26 | ∞ | | | |
| Image plane (Image pickup surface) | ∞ | | | |

| Aspherical surface data |
|---|
| 6th surface |
| K = −0.774 |
| A4 = −6.99084e−05, A6 = −1.63964e−06 |
| 7th surface |
| K = −0.604 |
| A4 = 1.85716e−05, A6 = −1.06515e−06 |
| 13th surface |
| K = −1.175 |
| A4 = 3.45070e−05, A6 = −1.39300e−05 |
| 16th surface |
| K = −2.714 |
| A4 = 1.15704e−03, A6 = −2.57943e−06 |
| 17th surface |
| K = 0.000 |
| A4 = 1.77061e−03, A6 = −1.33371e−05 |
| 22nd surface |
| K = −5.000 |
| A4 = −1.33394e−04, A6 = 1.40162e−05 |

-continued

Unit mm

23rd surface

K = 0.000
A4 = −1.06788e−03, A6 = 2.28369e−05

Zoom data

|  | WE | ST2 | TE | ST1 | ST3 |
|---|---|---|---|---|---|
| Focal length | 6.29 | 10.64 | 18.00 | 8.18 | 13.84 |
| Fno. | 3.54 | 4.21 | 4.52 | 3.84 | 4.50 |
| Angle of field 2ω | 66.13 | 39.10 | 23.33 | 50.31 | 30.35 |
| fb (in air) | 1.53 | 1.53 | 1.53 | 1.53 | 1.53 |
| Lens total length(in air) | 37.93 | 37.93 | 37.93 | 37.93 | 37.93 |
| d7 | 0.40 | 2.88 | 5.68 | 1.71 | 4.13 |
| d12 | 5.68 | 3.21 | 0.40 | 4.37 | 1.95 |
| d15 | 3.64 | 1.87 | 1.00 | 2.82 | 1.12 |
| d19 | 3.39 | 3.25 | 2.89 | 3.37 | 3.14 |
| d21 | 2.24 | 4.16 | 5.39 | 3.07 | 5.02 |

Group focal length f1 = 12.12 f2 = −6.19 f3 = 15.69 f4 = 10.16 f5 = −8.00 f6 = 16.56

Example 2

Unit mm

Surface data

| Surface no. | r | d | nd | νd |
|---|---|---|---|---|
| Object plane | ∞ | ∞ | | |
| 1 | ∞ | 0.00 | | |
| 2 | 103.342 | 0.70 | 1.92286 | 18.90 |
| 3 | 10.488 | 1.20 | | |
| 4 | ∞ | 7.30 | 1.84666 | 23.78 |
| 5 | ∞ | 0.20 | | |
| 6* | 13.136 | 1.61 | 1.80610 | 40.88 |
| 7 | −17.578 | Variable | | |
| 8 | −22.899 | 0.50 | 1.88300 | 40.76 |
| 9 | 16.472 | 0.45 | | |
| 10 | −25.339 | 0.50 | 1.78800 | 47.37 |
| 11 | 8.666 | 1.11 | 1.92286 | 18.90 |
| 12 | 29.546 | Variable | | |
| 13* | 14.923 | 0.85 | 1.53071 | 55.69 |
| 14 | ∞ | 0.40 | | |
| 15(Stop) | ∞ | Variable | | |
| 16* | 4.400 | 2.58 | 1.49700 | 81.54 |
| 17* | −8.027 | 0.68 | | |
| 18 | 6.921 | 0.78 | 1.84666 | 23.78 |
| 19 | 3.449 | Variable | | |
| 20* | −20.000 | 0.60 | 1.63493 | 23.90 |
| 21 | 14.353 | Variable | | |
| 22 | 49.709 | 1.84 | 1.53071 | 55.69 |
| 23* | −11.000 | 0.00 | | |
| 24 | ∞ | 0.20 | | |
| 25 | ∞ | 0.50 | 1.51633 | 64.14 |
| 26 | ∞ | | | |
| Image plane (Image pickup surface) | ∞ | | | |

Aspherical surface data

6th surface

K = −2.954
A4 = 5.02895e−05, A6 = −1.18713e−06

13th surface

K = −1.969
A4 = 1.04106e−04, A6 = −1.38113e−05

16th surface

K = −2.313
A4 = 1.74342e−03, A6 = −4.00607e−05

17th surface

K = 0.413
A4 = 1.62982e−03, A6 = −3.16420e−05

20th surface

K = 5.000
A4 = −8.14081e−05, A6 = −1.27850e−04

23rd surface

K = 4.067
A4 = 2.12756e−03, A6 = −1.34525e−04, A8 = 3.63385e−06

Zoom data

|  | WE | ST2 | TE | ST1 | ST3 |
|---|---|---|---|---|---|
| Focal length | 6.65 | 11.25 | 19.02 | 8.65 | 14.63 |
| Fno. | 3.49 | 4.44 | 4.95 | 3.94 | 4.90 |
| Angle of field 2ω | 63.08 | 37.26 | 22.05 | 48.20 | 28.80 |
| fb (in air) | 1.63 | 1.63 | 1.63 | 1.63 | 1.63 |
| Lens total length(in air) | 39.43 | 39.43 | 39.43 | 39.43 | 39.43 |
| d7 | 0.40 | 2.64 | 5.59 | 1.53 | 3.84 |
| d12 | 5.59 | 3.35 | 0.40 | 4.45 | 2.14 |
| d15 | 4.31 | 2.08 | 1.00 | 3.21 | 1.12 |
| d19 | 4.03 | 3.68 | 3.80 | 3.78 | 3.73 |
| d21 | 2.18 | 4.76 | 5.72 | 3.53 | 5.68 |

Group focal length f1 = 13.64 f2 = −6.91 f3 = 28.00 f4 = 9.74 f5 = −12.94 f6 = 17.08

Example 3

Unit mm

Surface data

| Surface no. | r | d | nd | νd |
|---|---|---|---|---|
| Object plane | ∞ | ∞ | | |
| 1 | ∞ | 0.00 | | |
| 2 | 70.013 | 0.70 | 1.94595 | 17.98 |
| 3 | 10.002 | 1.29 | | |
| 4 | ∞ | 7.30 | 1.84666 | 23.78 |
| 5 | ∞ | 0.20 | | |
| 6* | 12.935 | 1.63 | 1.80610 | 40.88 |
| 7 | −17.396 | Variable | | |
| 8 | −20.526 | 0.50 | 1.83481 | 42.71 |
| 9 | 15.585 | 0.49 | | |
| 10 | −28.995 | 0.50 | 1.80400 | 46.57 |
| 11 | 7.235 | 1.21 | 1.92286 | 18.90 |
| 12 | 24.657 | Variable | | |
| 13* | 13.935 | 0.90 | 1.53367 | 55.82 |
| 14 | ∞ | 0.40 | | |
| 15(Stop) | ∞ | Variable | | |
| 16* | 4.565 | 2.60 | 1.49700 | 81.54 |
| 17* | −7.576 | 0.72 | | |
| 18 | 7.336 | 0.70 | 1.92286 | 20.88 |
| 19 | 3.750 | Variable | | |
| 20* | −20.000 | 0.60 | 1.63493 | 23.90 |
| 21* | 19.570 | Variable | | |
| 22* | 12.104 | 1.09 | 1.63493 | 23.90 |
| 23 | 68.084 | 0.00 | | |
| 24 | ∞ | 0.20 | | |

-continued

Unit mm

| | | | | |
|---|---|---|---|---|
| 25 | ∞ | 0.50 | 1.51633 | 64.14 |
| 26 | ∞ | | | |
| Image plane (Image pickup surface) | ∞ | | | |

Aspherical surface data

6th surface

K = −1.750
A4 = −9.00224e−06, A6 = −7.85006e−07, A8 = −2.3555e−09
13th surface

K = −3.586
A4 = 2.10649e−04, A6 = −3.26039e−05, A8 = 2.19504e−06
16th surface

K = −2.046
A4 = 9.94381e−04, A6 = −5.98107e−06, A8 = −1.31721e−06
17th surface

K = 0.334
A4 = 1.56279e−03, A6 = −1.78961e−05, A8 = −8.58221e−07
20th surface

K = −5.000
A4 = 5.13699e−04, A6 = −1.42025e−04, A8 = 1.14173e−05
21st surface

K = 5.000
A4 = 4.00731e−04, A6 = −8.42378e−05, A8 = 1.07902e−05
22nd surface

K = 4.901
A4 = −7.22257e−04, A6 = −2.68119e−07

Zoom data

| | WE | ST2 | TE | ST1 | ST3 |
|---|---|---|---|---|---|
| Focal length | 6.29 | 10.64 | 18.00 | 8.18 | 13.84 |
| Fno. | 3.52 | 4.36 | 4.27 | 3.89 | 3.99 |
| Angle of field 2ω | 66.65 | 38.54 | 22.84 | 50.21 | 29.71 |
| fb (in air) | 1.53 | 1.53 | 1.53 | 1.53 | 1.53 |
| Lens total length(in air) | 38.93 | 38.93 | 38.93 | 38.93 | 38.93 |
| d7 | 0.30 | 2.66 | 5.12 | 1.56 | 3.75 |
| d12 | 5.12 | 2.75 | 0.30 | 3.86 | 1.67 |
| d15 | 4.41 | 2.44 | 0.80 | 3.49 | 1.40 |
| d19 | 4.66 | 4.49 | 4.58 | 4.59 | 4.49 |
| d21 | 2.09 | 4.23 | 5.78 | 3.08 | 5.28 |

Group focal length f1 = 13.30 f2 = −6.68 f3 = 26.00 f4 = 9.94 f5 = −15.34 f6 = 22.79

Example 4

Unit mm

Surface data

| Surface no. | r | d | nd | vd |
|---|---|---|---|---|
| Object plane | ∞ | ∞ | | |
| 1 | ∞ | 0.00 | | |
| 2 | 189.831 | 0.70 | 1.92286 | 20.88 |
| 3 | 10.344 | 1.26 | | |
| 4 | ∞ | 7.28 | 1.84666 | 23.78 |
| 5 | ∞ | 0.20 | | |
| 6* | 11.133 | 1.77 | 1.77377 | 47.17 |
| 7 | −17.292 | Variable | | |
| 8 | −19.873 | 0.50 | 1.88300 | 40.76 |

-continued

Unit mm

| | | | | |
|---|---|---|---|---|
| 9 | 14.012 | 0.51 | | |
| 10 | −32.112 | 0.50 | 1.80400 | 46.57 |
| 11 | 8.075 | 1.16 | 1.94595 | 17.98 |
| 12 | 29.464 | Variable | | |
| 13* | 12.769 | 0.90 | 1.55332 | 71.68 |
| 14 | ∞ | 0.40 | | |
| 15(Stop) | ∞ | Variable | | |
| 16* | 4.805 | 2.47 | 1.61881 | 63.85 |
| 17* | −7.750 | 0.61 | | |
| 18 | 15.485 | 0.51 | 1.84666 | 23.78 |
| 19 | 3.900 | Variable | | |
| 20* | 51.356 | 0.60 | 1.63493 | 23.90 |
| 21* | 7.451 | Variable | | |
| 22* | 68.320 | 1.78 | 1.63493 | 23.90 |
| 23* | −8.864 | 0.00 | | |
| 24 | ∞ | 0.30 | | |
| 25 | ∞ | 0.50 | 1.51633 | 64.14 |
| 26 | ∞ | | | |
| Image plane (Image pickup surface) | ∞ | | | |

Aspherical surface data

6th surface

K = −1.548
A4 = −2.61396e−05, A6 = −1.27932e−06, A8 = 1.94027e−08
13th surface

K = 0.000
A4 = −8.81824e−05, A6 = −1.41002e−05
16th surface

K = −0.992
A4 = −1.17964e−04, A6 = 3.03532e−05
17th surface

K = −5.000
A4 = 8.05435e−04
20th surface

K = 0.000
A4 = −6.92507e−05
21st surface

K = 0.000
A4 = −1.65965e−04, A6 = 2.64891e−05, A8 = 2.17819e−06
22nd surface

K = 0.000
A4 = 7.75246e−04, A6 = 3.31851e−05
23rd surface

K = 0.000
A4 = 2.23602e−03

Zoom data

| | WE | ST2 | TE | ST1 | ST3 |
|---|---|---|---|---|---|
| Focal length | 6.29 | 10.64 | 18.00 | 8.18 | 13.84 |
| Fno. | 3.41 | 4.28 | 4.62 | 3.77 | 4.58 |
| Angle of field 2ω | 66.63 | 38.93 | 22.93 | 50.33 | 29.90 |
| fb (in air) | 1.42 | 1.39 | 1.45 | 1.41 | 1.37 |
| Lens total length(in air) | 38.92 | 38.89 | 38.95 | 38.91 | 38.87 |
| d7 | 0.30 | 2.50 | 5.44 | 1.52 | 3.81 |
| d12 | 5.44 | 3.25 | 0.30 | 4.23 | 1.93 |
| d15 | 4.13 | 2.02 | 1.20 | 3.22 | 1.33 |
| d19 | 4.38 | 3.82 | 3.37 | 4.22 | 3.82 |
| d21 | 2.09 | 4.76 | 6.03 | 3.17 | 5.45 |

Group focal length f1 = 12.29 f2 = −6.52 f3 = 23.00 f4 = 10.49 f5 = −13.67
f6 = 12.35

Values of each of the conditional expressions are shown as below:

| Conditional expression | Example1 | Example2 | Example3 | Example4 |
|---|---|---|---|---|
| (1)f1/√(fw · ft) | 1.14 | 1.21 | 1.25 | 1.15 |
| (2)pri/IH | 1.90 | 1.88 | 1.88 | 1.87 |
| (3)f3/√(fw · ft) | 1.47 | 2.49 | 2.44 | 2.16 |
| (4)f4/√(fw · ft) | 0.95 | 0.87 | 0.93 | 0.99 |
| (5)f4_b/√(fw · ft) | −0.91 | −0.80 | −0.85 | −0.58 |
| (6)f5/√(fw · ft) | −0.75 | −1.15 | −1.44 | −1.28 |
| (7)f2_a/f2 | 1.36 | 1.55 | 1.57 | 1.41 |
| (8)f2_b/f2 | 1.21 | 1.17 | 1.07 | 1.22 |

Thus, it is possible to use such image forming optical system of the present invention in an image pickup apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

While optical systems having a straight optical path have been described as illustrative embodiments, these optical systems can be replaced by zoom lenses with a bent optical path as a matter of course.

Figure 9:
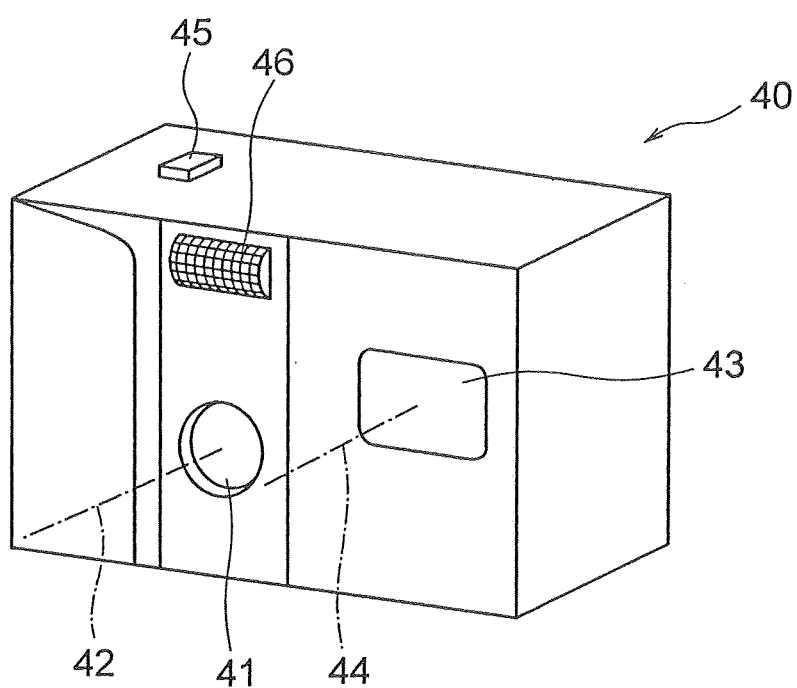
FIG. 9 is a front perspective view showing the outer appearance of a digital camera 40 equipped with an optical system according to the present invention.
Figure 10:
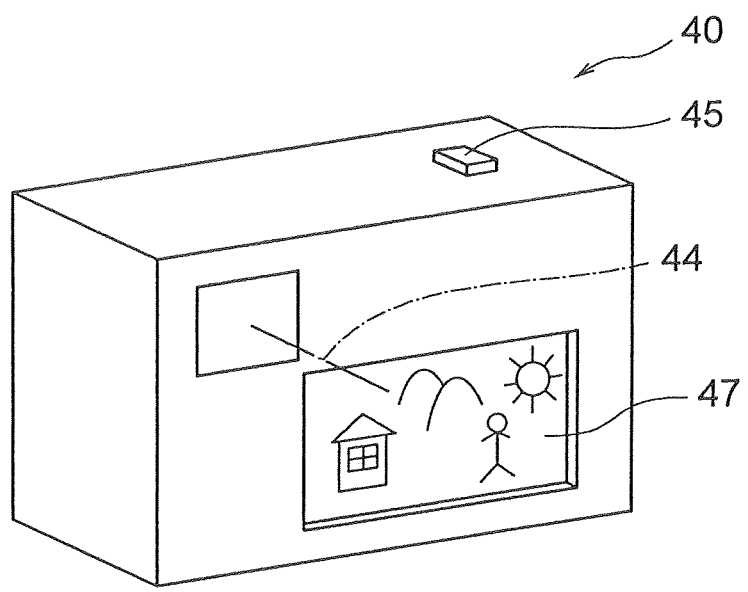
FIG. 10 is a rear perspective view of the digital camera 40.
Figure 11:
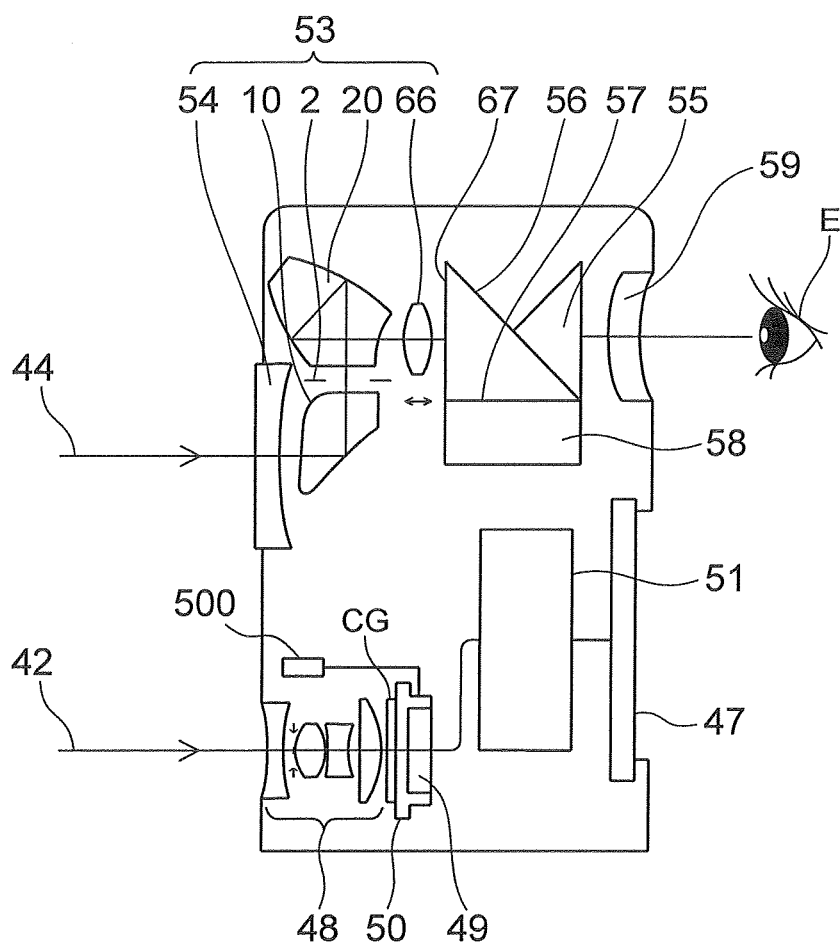
FIG. 11 is a cross sectional view showing the optical construction of the digital camera 40.

In FIG. 9 to FIG. 11 show conceptual diagrams of structures in which the image forming optical system according to the present invention is incorporated in a photographic optical system 41 of a digital camera. FIG. 9 is a frontward perspective view showing an appearance of a digital camera 40, FIG. 10 is a rearward perspective view of the same, and FIG. 11 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter button 45, a flash 46, and a liquid-crystal display monitor 47. Moreover, when the shutter button 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 is formed on an image pickup surface of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness.

The taking optical system 41 is equipped with an auto focusing mechanism 500 integral therewith. The auto focusing mechanism 500 enables focusing on an object at any distance.

It is preferred that an electronic image pickup device chip (electronic image pickup element) be integrated with the taking optical system 41.

The integration of the electronic image pickup element enables conversion of an optical image formed by the zoom lens into an electrical signal. Here, the use may be made of an electronic image pickup element that allows reduction in variation of brightness between the central region and the peripheral region of the image. With the use of such an electronic image pickup element, a digital camera (image pickup apparatus) that is small in size and has excellent performance can be provided.

Figure 12:
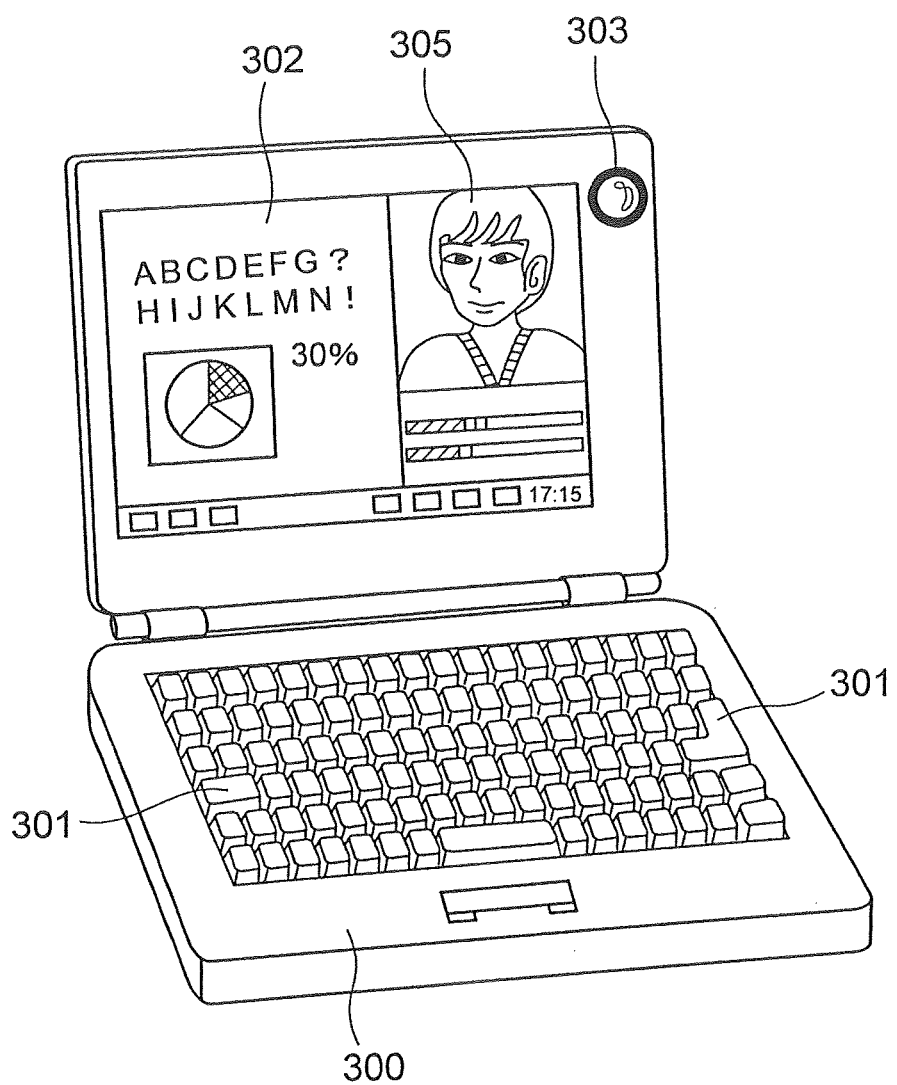
FIG. 12 is a front perspective view showing a personal computer 300 as an example of an information processing apparatus in which an optical system according to the present invention is provided as an objective optical system, in a state in which the cover is open.
Figure 13:
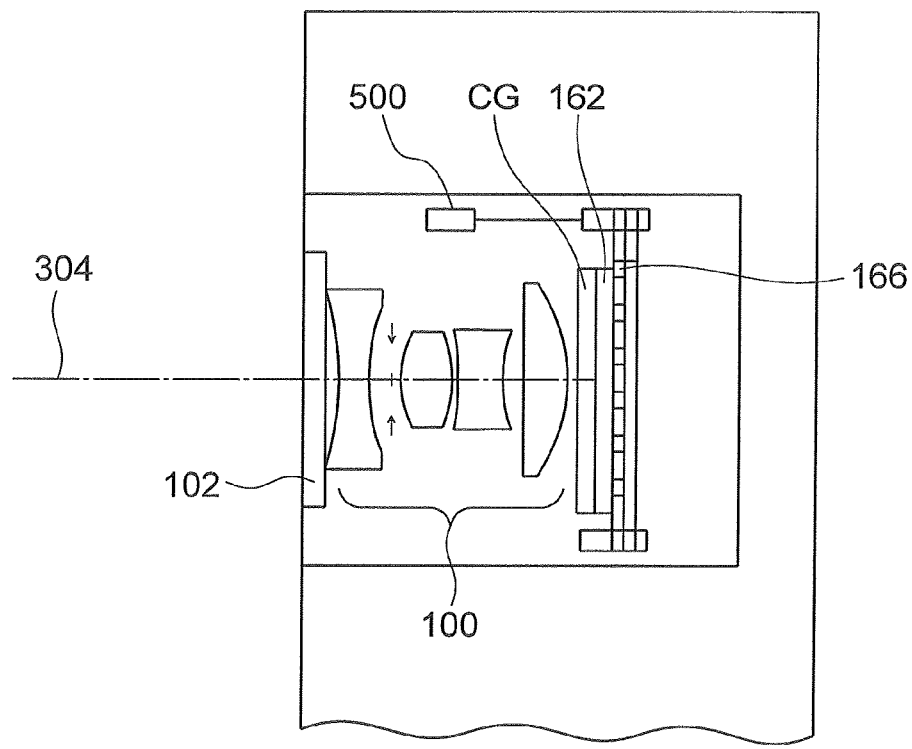
FIG. 13 is a cross sectional view of the taking optical system 303 of the personal computer 300.
Figure 14:
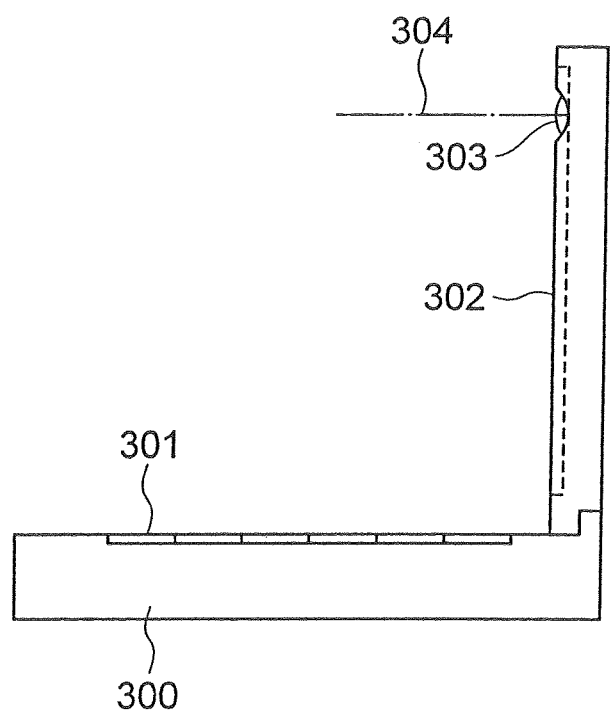
FIG. 14 is a side view of the personal computer 300.

Next, a personal computer which is an example of an information processing apparatus with a built-in image forming system as an objective optical system is shown in FIG. 12 to FIG. 14. FIG. 12 is a frontward perspective view of a personal computer 300 with its cover opened, FIG. 13 is a cross-sectional view of a photographic optical system 303 of the personal computer 300, and FIG. 14 is a side view of FIG. 12. As it is shown in FIG. 12 to FIG. 14, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 12, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The objective optical system 100 (zoom lens) is equipped with an auto focusing mechanism 500 integral therewith. The auto focusing mechanism 500 enables focusing on an object at any distance.

It is preferred that the electronic image pickup device chip 162 (electronic image pickup element) be integrated with the objective optical system 100 (zoom lens).

The integration of the electronic image pickup element enables conversion of an optical image formed by the zoom lens into an electrical signal. Here, the use may be made of an electronic image pickup element that allows reduction in variation of brightness between the central region and the peripheral region of the image. With the use of such an electronic image pickup element, a personal computer (image pickup apparatus) that is small in size and has excellent performance can be provided.

Figure 15A:
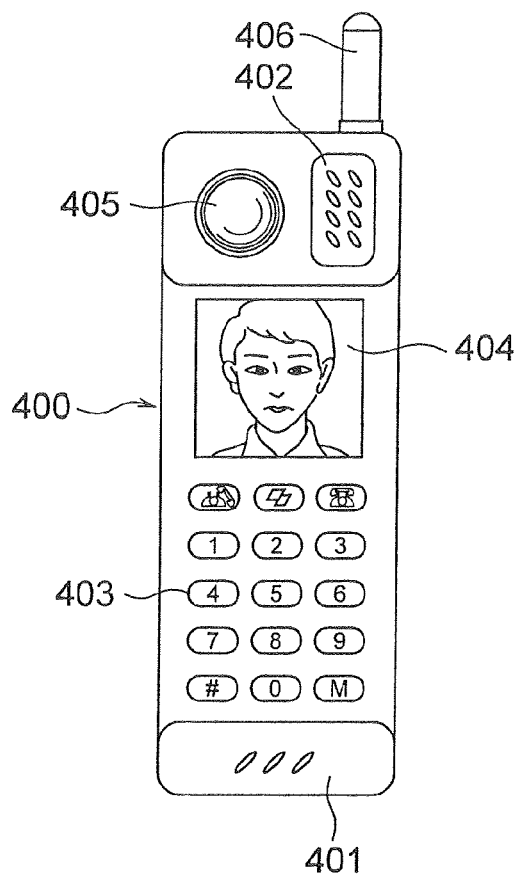
FIGS. 15A, 15B, and 15C show a cellular phone as an example of an information processing apparatus in which an optical system according to the present invention is provided as a taking optical system, where
Figure 15B:
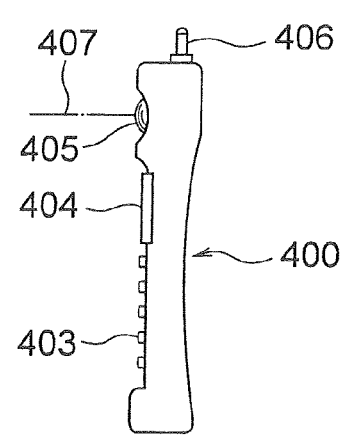
Figure 15C:
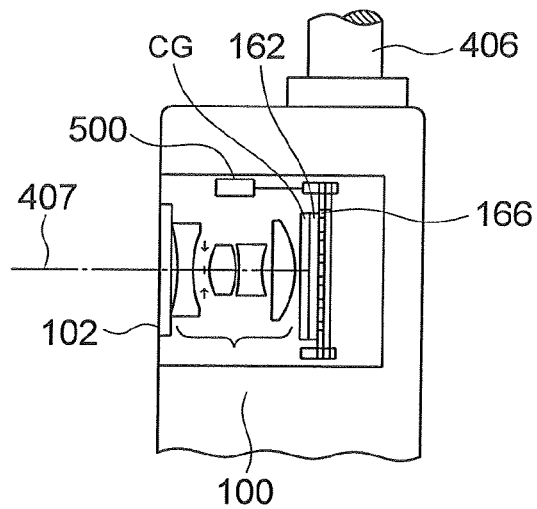

Next, a telephone which is an example of an information processing apparatus in which the image forming optical system of the present invention is built-in as a photographic optical system, particularly a portable telephone which is easy to carry is shown in FIG. 15A, FIG. 15B, and FIG. 15C. FIG. 15A is a front view of a portable telephone 400, FIG. 15B is a side view of the portable telephone 400, and FIG. 15C is a cross-sectional view of a photographic optical system 405. As shown in FIG. 15A to FIG. 15C, the portable telephone 400 includes a microphone section 401, a speaker section 402, an input button 403, a monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The objective optical system 100 (zoom lens) is equipped with an auto focusing mechanism 500 integral therewith. The auto focusing mechanism 500 enables focusing on an object at any distance.

It is preferred that the electronic image pickup device chip 162 (electronic image pickup element) be integrated with the objective optical system 100 (zoom lens). The integration of the electronic image pickup element enables conversion of an optical image formed by the zoom lens into an electrical signal. Here, the use may be made of an electronic image pickup element that allows reduction in variation of brightness between the central region and the peripheral region of the image. With the use of such an electronic image pickup element, a cellular phone (image pickup apparatus) that is small in size and has excellent performance can be provided.

The present invention can have various modifications which fairly fall within the basic teaching herein set forth.

As described in the foregoing, the present invention can suitably applied to a compact zoom lens with well-corrected aberrations (in particular astigmatism) in the peripheral region, in particular a zoom lens with a bent optical path, which is advantageous for slimming. The present invention can also be applied to an image pickup apparatus using such a zoom lens.

According to the present invention, there can be provided a compact zoom lens with well-corrected aberrations (in particular astigmatism) in the peripheral region, in particular a zoom lens with a bent optical path, which is advantageous for slimming, and an image pickup apparatus using such a zoom lens.

What is claimed is:

1. A zoom lens comprising, in order from the object side:
    a first lens group having a positive refractive power;
    a second lens group having a negative refractive power;
    a third lens group having a positive refractive power;
    a fourth lens group having a positive refractive power;
    a fifth lens group having a negative refractive power; and
    a sixth lens group having a positive refractive power,
wherein:
    during zooming from the wide angle end to the telephoto end, the first lens group, the third lens group, and the sixth lens group are fixed, the second lens group, the fourth lens group, and the fifth lens group move,
    the first lens group comprises a reflecting optical element that bends the optical path,
    the second lens group comprises, in order from the object side, a negative lens and a cemented lens made up of a negative lens and a positive lens,
    the third lens group comprises an aperture stop,
    the fourth lens group comprises, in order from the object side, a positive lens and a negative lens,
    the fifth lens group comprises a negative lens, and
    the zoom lens satisfies the following conditional expressions (1) and (2):

$$0.5 \leq f1/\sqrt{(fw \cdot ft)} \leq 2.0 \quad (1), \text{ and}$$

$$1.0 \leq pri/IH \leq 2.5 \quad (2),$$

where f1 is the focal length of the first lens group, fw is the focal length of the entire zoom lens system at the wide angle end, ft is the focal length of the entire zoom lens system at the telephoto end, pri is the thickness of the reflecting optical element, and IH is the largest image height on the image plane.

2. A zoom lens according to claim 1, wherein the zoom lens satisfies the following conditional expressions (7) and (8):

$$0.5 \leq f2\_a/f2 \leq 3.0 \quad (7), \text{and}$$

$$0.5 \leq f2\_b/f2 \leq 3.0 \quad (8),$$

where f2 is the focal length of the second lens group, f2_a is the focal length of the negative lens located closest to the object side in the second lens group, and f2_b is the focal length of the negative lens located closest to the image side in the second lens group.

3. A zoom lens according to claim 1, wherein the third lens group comprises one positive lens located on the object side of the aperture stop, and the zoom lens satisfies the following conditional expression (3):

$$1.0 \leq f3/\sqrt{(fw \cdot ft)} \leq 4.0 \quad (3),$$

where f3 is the focal length of the third lens group, fw is the focal length of the entire zoom lens system at the wide angle end, and ft is the focal length of the entire zoom lens system at the telephoto end.

4. A zoom lens according to claim 1, wherein the positive lens in the fourth lens group is a bi-aspheric lens, and the zoom lens satisfies the following conditional expression (4):

$$0.5 \leq f4/\sqrt{(fw \cdot ft)} \leq 2.0 \quad (4),$$

where f4 is the focal length of the fourth lens group, fw is the focal length of the entire zoom lens system at the wide angle end, and ft is the focal length of the entire zoom lens system at the telephoto end.

5. A zoom lens according to claim 1, wherein the zoom lens satisfies the following conditional expression (5):

$$-2.0 \leq f4\_b/\sqrt{(fw \cdot ft)} \leq -0.1 \quad (5),$$

where f4_b is the focal length of negative lens in the fourth lens group, fw is the focal length of the entire zoom lens system at the wide angle end, and ft is the focal length of the entire zoom lens system at the telephoto end.

6. A zoom lens according to claim 1, wherein the fifth lens group moves from the image side toward the object side during zooming from the wide angle end to the telephoto end, focusing is performed only by the fifth lens group, and the zoom lens satisfies the following conditional expression (6):

$$-2 \leq f5/\sqrt{(fw \cdot ft)} \leq -0.1 \quad (6),$$

where f5 is the focal length of the fifth lens group, fw is the focal length of the entire zoom lens system at the wide angle end, and ft is the focal length of the entire zoom lens system at the telephoto end.

7. An image pickup apparatus comprising:
a zoom lens according to claim 1; and
an image pickup element.

* * * * *

UNITED STATES PATENT AND TRADEMARK OFFICE
CERTIFICATE OF CORRECTION

PATENT NO. : 8,665,530 B2  
APPLICATION NO. : 13/542002  
DATED : March 4, 2014  
INVENTOR(S) : Takashi Fujikura It is certified that error appears in the above-identified patent and that said Letters Patent is hereby corrected as shown below:

In the Specification  
at column 9, line 25, change "sixth" to "six";  
at column 11, line 50, change "vd1, vd2" to "$v$d1, $v$d2";  
at column 11, line 66, change "/" to "]";  
at column 17, line 29, delete "In"; and In the Claims  
at column 22, line 8, change "of negative" to "of the negative".

Signed and Sealed this  
Second Day of September, 2014

Michelle K. Lee  
*Deputy Director of the United States Patent and Trademark Office*